United States Patent [19]

Smiedt

[11] Patent Number: 5,036,987
[45] Date of Patent: Aug. 6, 1991

[54] BICYCLE STAND

[75] Inventor: Leslie Smiedt, Cape Town, South Africa

[73] Assignee: Park-A-Bike Close Corporation, Cape Town, South Africa

[21] Appl. No.: 490,152

[22] Filed: Mar. 7, 1990

[30] Foreign Application Priority Data

Mar. 7, 1989 [ZA] South Africa .................. 89/1733
Aug. 25, 1989 [ZA] South Africa .................. 89/6516

[51] Int. Cl.⁵ .......................................... A47F 7/00
[52] U.S. Cl. .................................... 211/22; 211/20
[58] Field of Search ................... 211/20, 22, 17, 19

[56] References Cited

U.S. PATENT DOCUMENTS

| 1,232,501 | 7/1917 | Colen | 211/19 |
| 3,907,114 | 9/1975 | Ewers | 211/20 |
| 4,047,614 | 9/1977 | Radek | 211/20 |
| 4,830,196 | 5/1989 | Csanady | 211/19 |

FOREIGN PATENT DOCUMENTS

| 659148 | 2/1965 | Belgium | 211/20 |
| 2546123 | 11/1984 | France | 211/22 |
| 223686 | 1/1943 | Switzerland | 211/20 |
| 305925 | 3/1955 | Switzerland | 211/20 |

Primary Examiner—Robert W. Gibson, Jr.
Attorney, Agent, or Firm—Kenyon & Kenyon

[57] ABSTRACT

A bicycle parking structure is disclosed which has a central column constituted by, or including, a circular array of vertically extending channels which are open radially outwardly so that the front wheel of a bicycle can be wheeled into, and then rolled up each channel. At an elevated position there is a plurality of supports for hooking under the rims of the front wheels of bicycles that have been rolled up the channels. The supports extend outwardly from the column and each support is L-shaped with one of its limbs lying generally tangentially with respect to the column and radially outwardly of the channels.

11 Claims, 3 Drawing Sheets

BICYCLE STAND

BACKGROUND OF THE INVENTION

The problem of parking bicycles in city centres, at shopping malls and at other places where a large number of people congregate has been one which has received attention over a long period of time. U.S. Pat. No. 706718 discloses one form of parking structure. This specification illustrates that as far back as 1901 it was realised that the most satisfactory way of parking bicycles was in a radial array. Subsequent developments are represented by Dutch specification No. 6501477 and British specification No. 1381576. In all three specifications the bicycles hang from hooks or the like which are on the underside of an overhead structure. In the British specification the bicycles are in individual compartments of an octagonal housing. In all forms the front wheel is raised above the rear wheel to reduce the effective length of the bicycle.

OBJECTS OF THE INVENTION

The main object of the present invention is to provide a bicycle parking structure which facilitates both parking of the bicycle and its subsequent removal.

Another object of the present invention is to provide surfaces which are above the parked bicycles and which can carry advertising material.

BRIEF DESCRIPTION OF THE INVENTION

According to the present invention there is provided a parking structure for bicycles, the structure including a post comprising a plurality of vertically extending channels arranged in a circular array and bounded by side flanges extending outwardly from said axis whereby the front wheels of bicycles to be parked can be wheeled into a channel from any side of the post, and a plurality of bicycle front wheel supports extending outwardly from the post at an elevated position for hooking under the rim of a bicycle front wheel that has been rolled up one of the channels.

In one form said structure comprises a central column to which a plurality of channel members are secured, said column and said channel members forming said post and said channel members terminating at the level of said front wheel supports, said column extending to a position above said front wheel supports. In this form, to provide an advertising facility, arms can protrude outwardly from said column at a level above said front wheel supports, and vertical panels can be mounted on said arms, said panels having surfaces for carrying advertising material.

Another form of said parking structure includes a plurality of channel members which are secured to one another, there being a column the lower end of which is entered from above into the central space bounded by the array of connected channel members, said column extending upwardly from said channel members and said column and said channel members forming said post. In this form of parking structure there can be arms which protrude outwardly from said column at a level above said front wheel supports, and vertical panels mounted on said arms, said panels having surfaces for carrying advertising material.

Each front wheel support is preferably in the form of a rod which is L-shaped, a first limb of each rod being secured to said post and extending outwardly to a position radially outwardly of the array of channel members and a second limb of each rod extending generally tangentially with respect to said post, each second limb lying radially outwardly of an associated one of the channel members. Each first limb can be secured to one of the flangs of the associated channel members to provide a rigid structure.

To permit bicycle wheels of different tyre widths to be accommodated, each flange of each channel member can have a bend therein, the bends being along vertical lines, first portions of the flanges of each channel member which are between said bends and said post diverging from one another in the direction away from the post and second portions of each channel member which are between the free edges of the channel member and the bends being parallel to one another.

BRIEF DESCRIPTION OF THE DRAWINGS

For a better understanding of the present invention, and to show how the same may be carried into effect, reference will not be made, by way of example, to the accompanying drawings in which.

Figure 1:
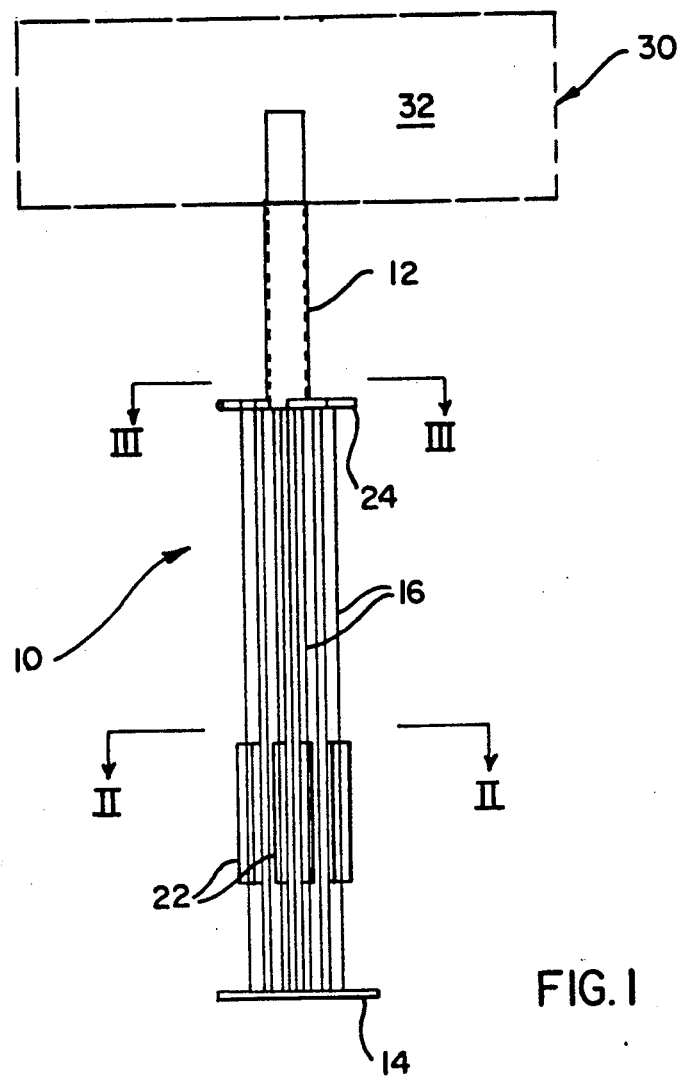
FIG. 1 is a side elevation of a bicycle parking structure.

Referring firstly to FIG. 1, the bicycle parking structure illustrated is generally referenced 10 and comprises a central hollow column 12 the lower end of which has a mounting plate 14 secured thereto. The plate 14 has bolt holes therein and bolts (not shown) are used to attach the plate 14 to a foundation (not shown).

Figure 2:
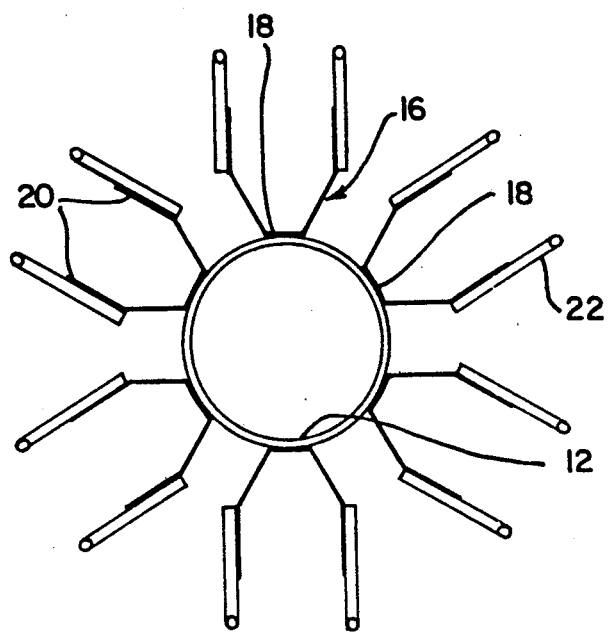
FIG. 2 is a section on the line II—II of FIG. 1 to a larger scale.

Vertically extending channel members 16 are welded to the column 12, the channel members 16 extending from the plate 14 to a position close to the upper end of the column 12. The column 12 and channel members 16 together form a post and the channel members are in an array around a central vertical axis. Each channel member 16 has its web 18 welded to the column 12 (see FIG. 2). Each flange 20 of each channel member 16 is bent along a vertical line. The portions of the flanges between the webs 18 and the bends diverge from one another in the direction away from the web. The portions of the flanges between the bends and the free edges of the flanges are parallel to one another. Secured to the parallel portions of the flanges 20 are bent bars 22. Each bar has upper and lower horizontal portions the free ends of which are welded to the flanges of the channel members 16. A vertical centre portion of each bar 22 joins the horizontal portions to one another and lies outwardly of the channel members. The bars 22 can be replaced by plates welded to the channel members 16, the plates having holes in them through which chains can be passed.

Figure 3:
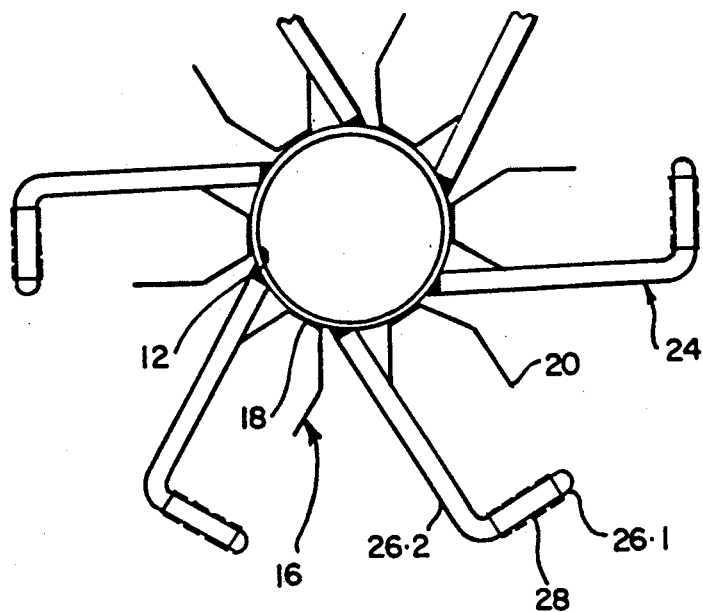
FIG. 3 is a section on the line III—III of FIG. 1, also to a larger scale.

At the level of the upper ends of the channel members 16 there are front wheel supports 24 (FIGS. 1, 3 and 4) which extend outwardly from the column 12. The supports 24 consist of rods, the rods having right angle bends therein so that their outer portions 26.1 lie tangentially with respect to the column 12. A sleeve 28 of rubber (shown in FIG. 3 but not FIG. 4) is slid onto each tangential portion 26.1. The inner portion 26.2 of each support 24 is welded to the column 12.

Figure 4:
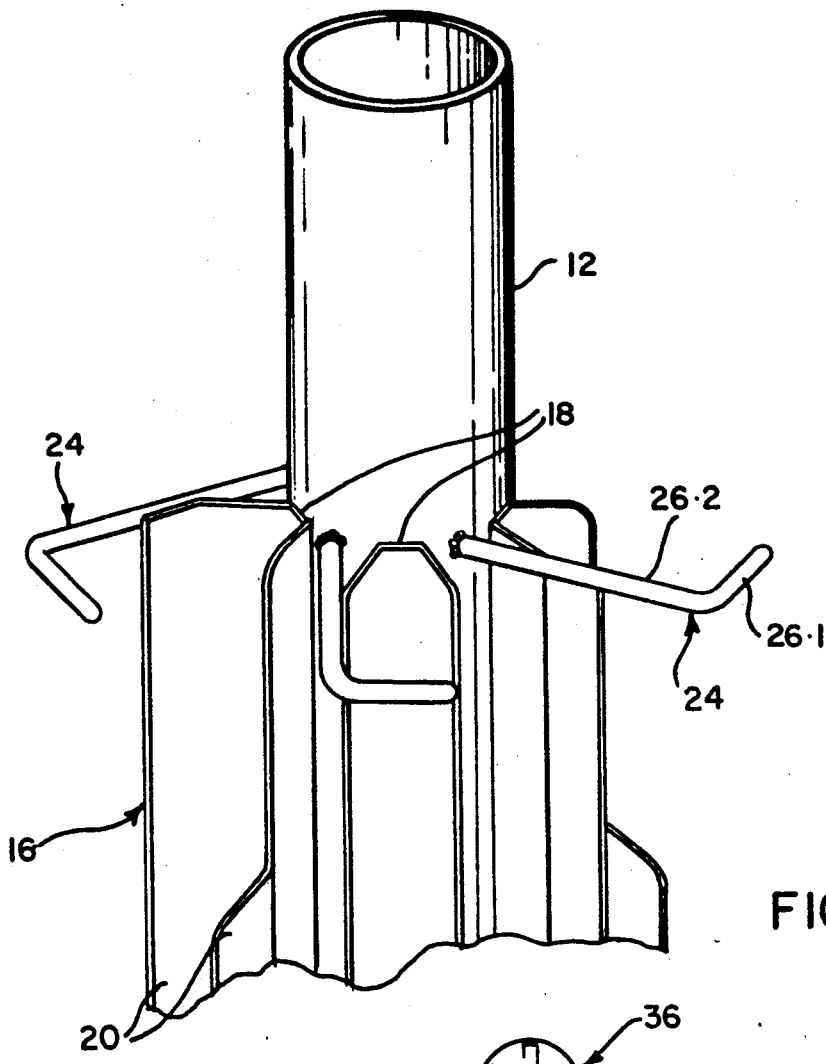
FIG. 4 is an elevation of the part of the structure illustrated in FIG. 3.
Figure 8:
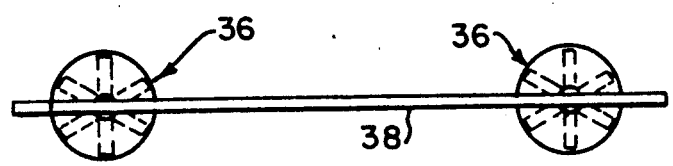
FIG. 8 is a top plan view of the structure of FIG. 7.

As best seen in FIG. 4, the outer portion of one flange 20 of each channel member 16 is cut away at its upper end. The inner portion 26.2 of each support 24 is welded to the outer portion of the other flange 20.

To park a bicycle on the structure, the front wheel is run into one of the channels provided by the channel members 16 and between the bars 22. The front wheel is lifted and rolled up the channel member 16 until it encounters one of the supports 24. By slightly turning the handle bars and simultaneously lifting the bicycle, the support 24 can be caused to pass through the spokes of the front wheel. Cutting away of one of the flanges of each channel member facilitates this movement. By then lowering the bicycle somewhat, it can be hung by the rim of the front wheel from the support 24. The rear wheel is now between the bars 22 and can be chained to them.

Figure 5:
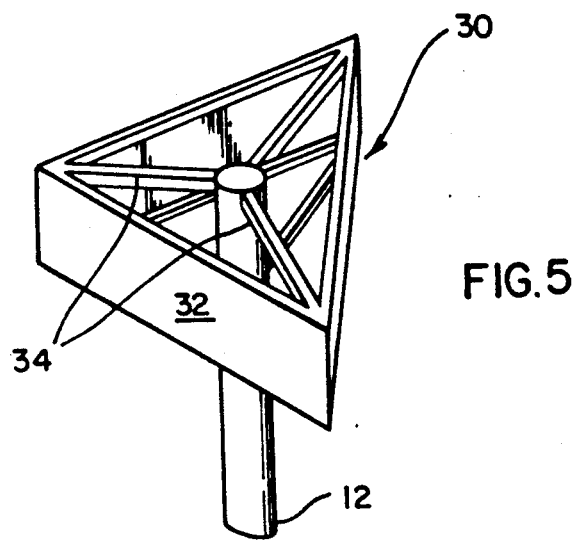
FIG. 5 is a pictorial view of a canopy of the structure.
Figure 6:
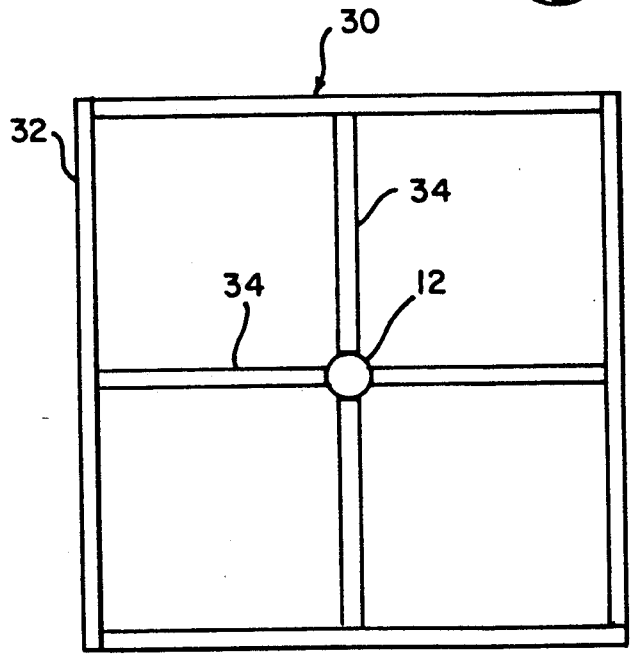
FIG. 6 is a top plan view which illustrates a further form of canopy.

At the upper end of the column 12 there is a canopy 30 (FIG. 1). The canopy 30 provides vertical surfaces 32 to which advertising material can be applied. The canopy 30 can be triangular in plan view to provide three surfaces 32 (see FIG. 5) or rectangular, as shown in FIG. 6, thereby to provide four surfaces 32. Both forms of canopy include arms 34 protruding outwardly from the column 12.

Figure 7:
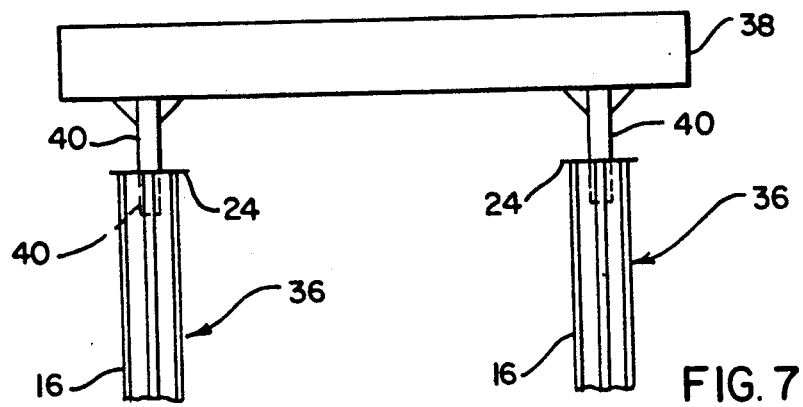
FIG. 7 is an elevation of a further form of bicycle parking structure.

In FIG. 7 there are two posts 36 joined at their upper ends by a double sided board 38 which provides two elongate advertising surfaces. The stand provides space for twelve bicycles. The board 38 can, if desired, be replaced by an overhead canopy similar to that shown in FIG. 6 and which provides four advertising surfaces.

The stand of FIG. 7 differs from that of FIG. 1 in that the channel members 16 are welded to one another and there is no full height column 12. Short columns 40 are inserted into the upper ends of the spaces bounded by the circular array of channel members and secured by bolting or welding to the channel members. Thus the lower part of each post is constituted by the channel members and the upper part of each post by one of the columns 40.

The use of channel members 16 facilitates construction. It will be understood, however, that the webs 18 can be omitted and the flanges 20 welded directly to the column 12. The front wheels of the bicycles are then rolled up the outer face of the column 12.

I claim:

1. A parking structure for bicycles including
a post comprising a central column and a plurality of vertically extending channel members secured in a circular array around said central column, at least some of said channel members having side flanges extending outwardly from said column so that the front wheels of bicycles to be parked can be wheeled into a channel member from any side of said post;
a plurality of bicycle front wheel supports secured to and extending outwardly from said post at an elevated position for hooking under the rims of bicycle front wheels that have been rolled up said channel members terminating at the level of said front wheel supports and said column extending to a position above said front wheel supports;
arms protruding outwardly from said column at a level above said front wheel supports; and
vertical panels mounted on said arms, said panels having surfaces for carrying advertising material.

2. A parking structure according to claim 1, in which each front wheel support is in the form of a rod which is L-shaped, a first limb of each rod being secured to said post and extending outwardly to a position radially outwardly of the array of channel members and a second limb of each rod extending generally tangentially with respect to said post, each second limb lying radially outwardly of an associated one of the channel members.

3. A parking structure according to claim 2 in which each first limb is secured to one of the flanges of the associated channel member.

4. A parking structure according to claim 1, in which each flange of each channel member has a bend therein, the bends being along vertical lines, first portions of the flanges of each channel member which are between said bends and the post diverging from one another in the direction away from the post and second portions of each channel member which are between the free edges of the channel member and the bends being parallel to one another.

5. A parking structure according to claim 4, in which each front wheel support includes a rod which is L-shaped, a first limb of each rod being secured to said post and extending outwardly to a position radially outwardly of the array of channel members and a second limb of each rod extending generally tangentially with respect to said post, each second limb lying radially outwardly of an associated one of the channel members and each first limb being secured to one of said second portions.

6. A parking structure according to claim 5, in which the other second portion of each channel is cut away from the level of said supports to a position below said supports.

7. A parking structure for bicycles including
a plurality of vertically extending channel members secured to one another in a circular array around a central vertical axis at least some of said members having side flanges extending outwardly from said axis whereby the front wheels of bicycles to be parked can be wheeled radially with respect to said axis into said channel members,
a column having a lower end entered from above into a central space bounded by said array of channel members, said column extending upwardly from said channel members to foam a post with said column; and
a plurality of bicycle front wheel supports extending outwardly from said post at an elevated position for hooking under the rims of bicycle front wheels that have been rolled up said channel members.

8. A parking structure according to claim 7 and which includes arms protruding outwardly from said column at a level above said front wheel supports, and vertical panels mounted on said arms, said panels having surfaces for carrying advertising material.

9. A parking structure for bicycles including
a post comprising a central column and a plurality of vertically extending channel members secured in a circular array around said central column, at least some of said channel members having side flanges extending outwardly from said column to receive the front wheels of bicycles to be parked, each said flange having along a vertical line, a first portion between said bend and said post diverging from an opposite first portion of an adjacent flange in a direction away from said post and a second portion between a free edge thereof and said bend being parallel to an opposite second portion of an adjacent flange, and a plurality of bicycle front wheel supports secured to and extending outwardly from said post at an elevated position for hooking under the rims of bicycle front wheels that have been rolled up said channel members, said channel members terminating at the level of said front wheel supports and said column extending to a position above said front wheel supports.

10. A parking structure according to claim 9 wherein each front wheel support includes an L-shaped rod, a first limb of said rod being secured to said column and to a respective second portion of a respective channel member and extending outwardly to a position radially outwardly of said array of channel members and a second limb of each rod extending generally tangentially with respect to said column, each second limb lying radially outwardly of an associated one of said channel members.

11. A parking structure according to claim 10 wherein each channel member has a second portion of a respective flange from the level of said rods to a position below said rods.

* * * * *

UNITED STATES PATENT AND TRADEMARK OFFICE
CERTIFICATE OF CORRECTION

PATENT NO. : 5,036,987
DATED : August 6, 1991
INVENTOR(S) : LESLIE SMIEDT It is certified that error appears in the above identified patent and that said Letters Patent is hereby corrected as shown below:

Column 2, line 5 change "flangs" to -flanges-

Signed and Sealed this

Twenty-second Day of December, 1992

*Attest:*

DOUGLAS B. COMER

*Attesting Officer*    *Acting Commissioner of Patents and Trademarks*